United States Patent [19]

Torisawa et al.

[11] Patent Number: 4,952,859
[45] Date of Patent: Aug. 28, 1990

[54] STEPPING MOTOR

[75] Inventors: Akira Torisawa, Machida; Katsumi Yoshida, Chichibu; Hiroshi Koizumi, Hanno; Hiroyuki Yoshikawa, Chichibu, all of Japan

[73] Assignees: Canon Kabushiki Kaisha, Tokyo; Canon Denshi Kabushiki Kaisha, Saitanam, both of Japan

[21] Appl. No.: 277,939

[22] Filed: Nov. 30, 1988

[51] Int. Cl.$^5$ .............................................. H07P 8/00
[52] U.S. Cl. .................................... 318/696; 318/685;
354/271.1; 310/49 R
[58] Field of Search ............. 318/676, 685; 310/49 R,
310/156, 67; 354/271.1

[56] References Cited

U.S. PATENT DOCUMENTS

| | | | |
|---|---|---|---|
| 3,014,141 | 12/1961 | Riggs | 310/156 |
| 3,496,393 | 2/1970 | Reifman et al. | 310/41 |
| 3,549,918 | 12/1970 | Croymans et al. | 310/49 |
| 3,860,843 | 1/1975 | Kawasaki et al. | 310/67 |
| 3,866,104 | 2/1975 | Heine | 318/696 |
| 4,174,485 | 11/1979 | Soden et al. | 310/89 |
| 4,255,696 | 3/1981 | Field II | 318/696 |
| 4,381,465 | 4/1983 | Renkl et al. | 310/49 |
| 4,504,755 | 3/1985 | Semonen et al. | 310/156 |
| 4,601,564 | 7/1986 | Yamamoto | 354/271.1 |
| 4,656,381 | 4/1987 | Komatsu | 310/257 |
| 4,672,253 | 6/1987 | Tajima et al. | 310/269 |
| 4,704,292 | 12/1988 | Torisawa et al. | 310/257 |

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A stepping motor characterized by the provision of an anisotropic resin magnet rotor which is the rotor of the motor and comprises an anisotropic resin magnet and which has recesses formed at the centers of the magnetic poles thereof and in which the wave form of the magnetic force is one of a two-head wave form and a trapezoidal wave form in the range of 0.1–0.2 of the air gap between the rotor and stator teeth during the use of the motor.

2 Claims, 6 Drawing Sheets

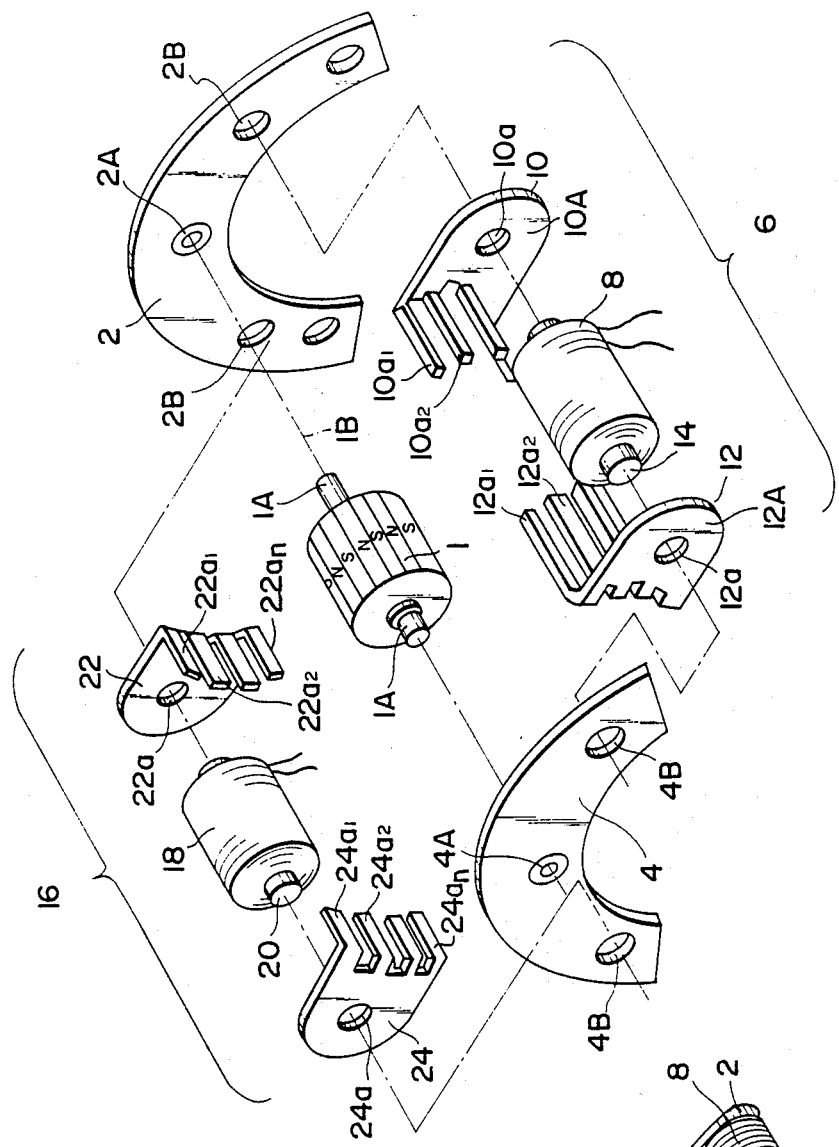
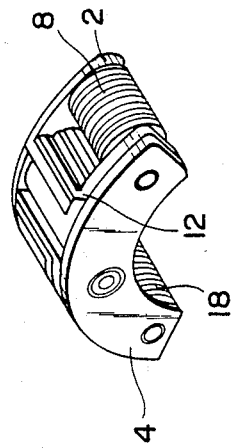

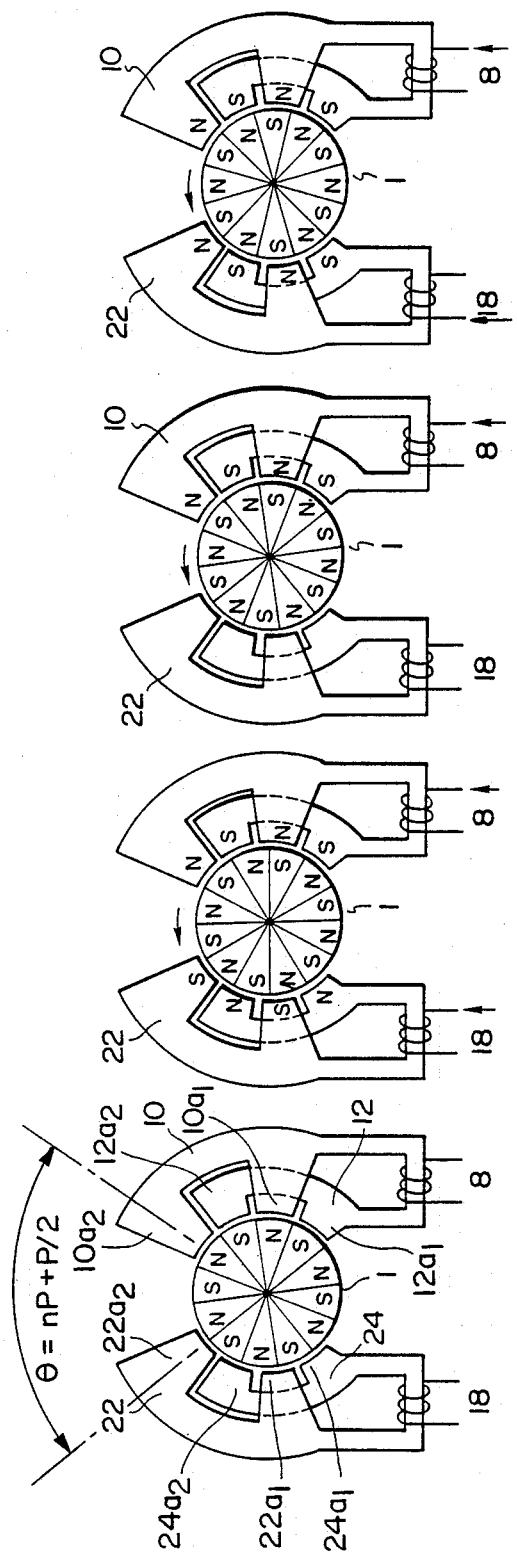

STATOR TOOTH POSITION

STEPPING MOTOR

BACKGROUND OF THE INVENTION

1. Field of the Invention

This invention relates to a stepping motor, and more particularly to a stepping motor for driving a diaphragm unit forming a diaphragm aperture by a plurality of diaphragm blades.

2. Related Background Art

Numerous so-called stepping motors in which pole teeth are disposed on the outer periphery of a rotor and said pole teeth are magnetized to step-drive the rotor about the axis of the rotary shaft thereof are known including those disclosed in U.S. Pat. Nos. 3,014,141, 3,549,918, 3,866,104, 4,174,485 and 4,381,465. Also some of the inventors concerned in the present invention filed in Japan a plurality of applications including Patent Application No. 61-85516 and Utility Model Application No. 61-55846 for a diaphragm driving device having a stepping motor as a drive source, and these Japanese applications were filed as U.S. application Ser. No. 035,453.

The diaphragm device of the aforementioned U.S. application Ser. No. 035,453 (filed in U.S. on Apr. 7, 1987) is designed such that the opening-closing operation of the diaphragm blades is accomplished by a stepping motor.

A plurality of diaphragm blades are combined and are adapted to be opened and closed to form a diaphragm aperture.

The diaphragm aperture has a relation to the exposure value of a camera, and the exposure value of the camera is determined by various types of information such as shutter speed, diaphragm aperture, brightness of an object and film speed, and is determined by said information being input to an exposure control device in the camera.

The diaphragm aperture has its aperture value determined by said exposure control device, and the diaphragm blades are operated to an aperture corresponding to the aperture value by the stepping motor and are stopped at the aperture corresponding to the aperture value.

On the other hand, the stepping motor has a stator provided with pole teeth arranged arcuately around a rotor having N (North) poles and S poles magnetized on the surface thereof. When the supply of electric power to the coil of the motor stopped, the rotor is stopped at a magnetically stable position by the magnetic attraction between the magnetic poles of the rotor and corresponding pole teeth of the stator.

When the supply of electric power to the stepping motor is stopped after the stepping motor is driven to the aforementioned aperture value calculated by the exposure calculating device to form the aperture of the diaphragm blades, the rotor moves to the aforementioned magnetically stable position. As a result, the diaphragm blades moved in response to the movement of the rotor and the aperture of the diaphragm blades varies. Therefore, the calculated aperture value and the aperture value of the aperture formed by the diaphragm blades become more or less different from each other and an error of exposure control arises.

SUMMARY OF THE INVENTION

A first task of the present invention is to provided a stepping motor for opening and closing the diaphragm blades which can control the diaphragm blades to the diaphragm aperture calculated by the exposure calculating device. In the rotor of the stepping motor, divergence and convergence of magnetic fluxes are effected from magnetized N and S poles and the wave form of magnetic flux distribution shown in FIG. 1A of the accompanying drawings is obtained as a sine curve.

FIG. 1A shows the relation between the strength of the magnetic field from the magnetic poles of the rotor and the stator, and in FIG. 1A, there is shown the preferable condition of the stopped positions of the rotor and the stator when the supply of electric power to the coil of the stepping motor is stopped. The preferable condition in this case is that the pitch of the teeth of the stator coincides with the pitch of the magnetized magnetic poles of the rotor and that the number of coggings produced from the torque balance by the teeth of the stator and the magnetic poles of the rotor is a multiple of the number of the poles of the magnet rotor.

However, the stopped position of the rotor deviates as shown in FIG. 1B of the accompanying drawings due to causes such as the irregularity of the strength of the magnetic poles of the rotor, the irregularity of the magnetizing position, the irregularity of the pitch of the teeth of the stator and the irregularity of the error gap between the rotor and the stator.

If the rotor is stopped at the stable position as shown in FIG. 1A whenever the supply of electric power to the coil is cut off, the diaphragm blades are stopped at the diaphragm aperture found by exposure calculation.

However, as described with reference to FIG. 1B, the rotor has stopped at a position deviating from the teeth of the stator, whereby the diaphragm aperture becomes different from the calculated value.

The aforedescribed problem becomes conspicuous when the distribution curve of the strength of the magnetic flux density of the rotor comprises a sine curve.

In order that the rotor may be stopped at the stable position as shown in FIG. 1A, the distribution curve of the magnetic flux density may be made into a trapezoidal wave form as shown in FIG. 1C of the accompanying drawings.

If said distribution curve is made into a trapezoidal wave form as shown in FIG. 1C, the torque produced by the attraction between the teeth of the stator and the magnetic poles of the rotor is made uniform in the direction of rotation. As a result, cogging force weakens and the stable position becomes a number corresponding to the double of the number of the magnetic poles of the rotor.

However, it is difficult to make the magnetization of a magnet rotor of cylindrical shape into a trapezoidal wave form.

A second task of the present invention is to propose a stepping motor designed such that the magnetization of rotor is made into a sine, curve while, on the other hand, the number of the magnetically stable positions during the stoppage of the rotor is increased and the deviation of the stopped position of the rotor does not occur when the supply of electric power to the coil is cut off.

BRIEF DESCRIPTION OF THE DRAWINGS

FIG. 2A is an exploded perspective view of a stepping motor according to the present invention.

FIG. 2B shows the stepping motor as assembled.

FIGS. 3A–3D illustrate the operation of the motor.

DESCRIPTION OF THE PREFERRED EMBODIMENT

Figure 5:
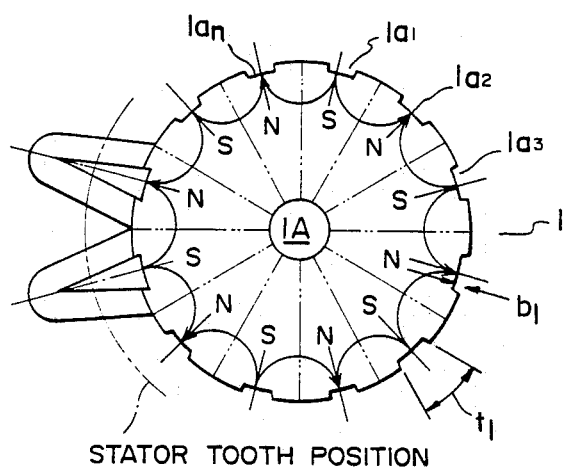
FIG. 5 is an illustration of the rotor.

FIG. 2A is an exploded perspective view of a motor according to an embodiment of the present invention. In FIG. 2A, the reference numeral 1 designates a magnet rotor. The rotor 1, as shown in FIG. 5, is formed of a magnetic material mixed with a resin material and is molded into a cylindrical shape and has N poles and S poles magnetized on the outer surface thereof. Recesses $1a_1, 1a_2, \ldots, 1a_n$ having a depth $b_1$ from the central portion of each magnetic pole on the outer surface of the rotor 1 and a width $t_1$ are formed simultaneously with the molding of the rotor body.

The reference characters 1A designate the shaft portion of the magnet rotor. This shaft portion is molded with the rotor body or is provided by fitting a shaft member to the rotor body. The reference numeral 2 denotes a motor supporting plate having an arcuate shape and having a bearing 2A fixed at the central position thereof. The reference characters 2B designate holes into which one end of coil iron cores to be described are fitted. The reference numeral 4 denotes a bearing plate of the same arcuate shape as the supporting plate 2. The reference characters 4B designate holes into which opposite ends of the coil iron cores to be described are fitted. The reference numeral 6 denotes a first yoke portion comprised of a first coil 8, a first yoke member 10 and a second yoke member 12. The first coil 8 comprises a coil wound on an iron core 14 by and having a predetermined number of turns. The first yoke member 10 and the second yoke member 12 respectively comprise a plate portion 10A and 12A and a plurality of tooth portions $10a_1, 10a_2, \ldots$, and $12a_1, 12a_2, \ldots$ rising from the end portions of said plate portions in a direction parallel to the axis 1B of said rotor shaft. The tooth portions are arranged in the form of an arc along the outer periphery of the rotor 1 at predetermined intervals.

The first and second yoke members 10 and 12 respectively have formed in the plate portions 10A and 12A holes $10a$ and $12a$ into which said iron core 14 is fitted. The first and second yoke members are fitted to the opposite ends of said iron core, and the tooth portions $10a_1, 10a_2, \ldots$ of the first yoke member and the tooth portions $12a_1, 12a_2, \ldots$ of the second yoke member are arranged so as to deviate by ½ of the pitch of the magnetic poles of the rotor.

The first and second yoke members 10 and 12 are fitted onto the iron core 14 having a coil wound thereon, whereafter one end of the iron core is fitted into a hole 2B in the motor supporting plate, and the respective members are fixed together by screws, not shown.

The reference numeral 16 designates a second yoke portion comprising an iron core 20 having a second coil 18 wound thereon and third and fourth yoke members 22 and 24. The third and fourth yoke members 22 and 24, like the yoke members of the first yoke portion, are respectively provided with tooth portions $22a_1, 22a_2, \ldots, 22a_n$ and $24a_1, 24a_2, \ldots, 24a_n$ and holes $22a$ and $24a$ into which an iron core 20 is fitted.

The incorporation of the second yoke portion 16 is accomplished in the same manner as the first yoke portion 6. The first and second yoke portions 6 and 16 are assembled to the motor supporting plate 2, whereafter the bearing plate 4 is placed on the motor shaft 1A.

The first yoke member 10 and the third yoke member 22 are fixed to the motor supporting plate 2 by screws, not shown, and the second yoke member 12 and the fourth yoke member 24 are likewise fixed to the bearing plate 4.

FIG. 2B shows a perspective view of the motor assembly.

A feature of the configuration of the motor of the present invention is that the rotor 1 and the stator units 6 and 16 are disposed between the arcuate motor supporting plate 2 and the arcuate bearing plate 4 and the stator units 6 and 16 are disposed at opposed positions about the shaft of the rotor.

The operation of the stepping motor thus constructed will now be described with reference to FIGS. 3A, 3B, 3C and 3D.

That is, in the stepping motor of this embodiment, the rotor 1 rotates by ¼ P (P=pitch) at each of four stages shown in FIGS. 3A→3B→3C→3D, and FIG. 3A shows the state of the motor in which electric power is supplied to neither of the coil 8 and the coil 18, and in this case, the magnetic poles provided on the rotor 1 form a magnetic path through the stator and the yoke members and therefore, the stator teeth $24a_1, 24a_2, \ldots$ of the left fourth yoke member 24 and the stator teeth $22a_1, 22a_2, \ldots$ of the left third yoke member 22 are each stopped in opposed relationship with the magnetic poles S and the magnetic poles N of the rotor 1.

On the other hand, the stator teeth $12a_1, 12a_2, \ldots$ of the right second yoke member 12 and the stator teeth $10a_1, 10a_2, \ldots$ of the first yoke member 10 are not each opposed to the magnetic poles S and the magnetic poles N of the rotor 1, but are in the semi-polar state, i.e., the state in which they deviate from one another by ½ P, and thus, they are set so as to deviate by ½ P between the right yoke phase and the left yoke phase.

That is, the pitch P is the pitch of the magnetized magnetic poles in the rotor 1 and thus, in this case, the angle $\theta$ shown in the figure is indicated by $\theta = nP + \frac{1}{2}P$. Also, the pitch between the stator teeth $22a_1, 22a_2, \ldots 24a_1, 24a_2, \ldots$ constituted by the third and fourth yoke members 22 and 24 and the pitch between the stator teeth $10a_1, 10a_2, \ldots, 12a_1, 12a_2, \ldots$ constituted by the first and second yoke members 10 and 12 are coincident with the above-mentioned pitch P.

When as shown in FIGS. 3A to 3B, electric power is supplied to the coil 8 in a forward direction (this state is A) and electric power is supplied to the coil 18 in a reverse direction (this state is B), N poles are produced on the stator teeth $24a_1, 24a_2, \ldots$ and S poles are produced on the stator teeth $22a_1, 22a_2, \ldots$ and further, S poles are produced on the stator teeth $12a_1, 12a_2, \ldots$ and N poles are produced on the stator teeth $10a_1, 10a_2,$ .... In this manner, the rotor 1 can be rotated in a counter-clockwise direction by the repulsion and attraction between the poles in the rotor and the poles produced in the individual stators. That is, at this time, the left stator teeth $24a_1$, $24a_2$, ..., $22a_1$, $22a_2$, and the right stator teeth $12a_1$, $12a_2$, ..., $10a_1$, $10a_2$, ... deviate from one another by $\frac{1}{2}$ P each and therefore, the poles in the rotor 1 and the poles on the yoke side move by $\frac{1}{4}$ P in the counterclockwise direction from the state of FIG. 3A in an attempt to keep balance, whereafter they become stable and stop.

Then, when in the state of FIG. 3B, the supply of electric power to the coil 18 is stopped and the power of electric power only to the coil 8 is continued to bring about the state of FIG. 3C, the stator teeth $12a_1$, $12a_2$, ... are kept at S poles and the stator teeth $10a_1$, $10a_2$, ... are kept at N poles, whereby the rotor 1 is further rotated by $\frac{1}{4}$ P in the counter-clockwise direction by the attraction between them and the opposed poles of the rotor 1.

Then, in the state of FIG. 3C, electric power is supplied to the coil 18 in a forward direction as shown in FIG. 3D, whereby on the basis of a similar principle, the rotor 1 can be further rotated by $\frac{1}{4}$ P in the counterclockwise direction.

Figure 4:
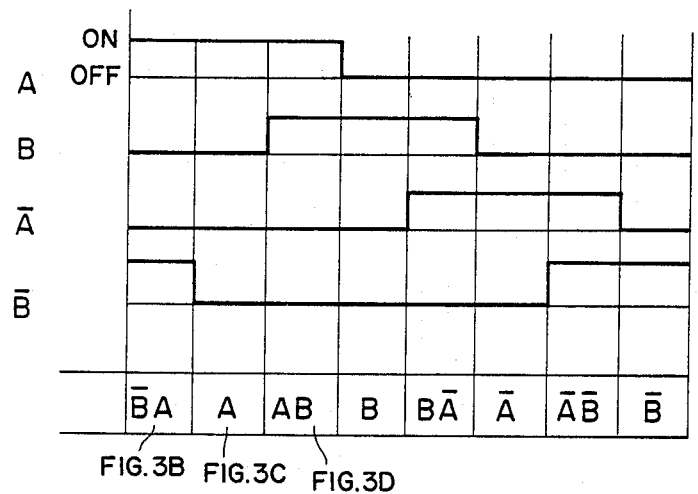
FIG. 4 is a timing chart.

The series of operation procedures described above will be further described with reference to FIG. 4. In FIG. 4, the horizontal axis shows the sequence of steps, and the states of supply of electric power to the coils 18 and 8 are further shown by steps. That is, there are eight combinations of power supply BA-B through steps S1, S2, S3, S4, S5, S6, S7 and S8, and such eight steps are sequence-controlled as one pulse, and by the repetition thereof, the rotor 1 can be rotated to any desired angle. Also, by controlling the power supply so that the above-described combinations of power supply progress reversely, the rotor 1 can be rotated in a clockwise direction.

FIG. 5 illustrates the distribution of magnetic flux density in the cross-section of the magnet rotor 1 used in the motor according to the present invention.

The magnet rotor 1 is provided by molding a plastic magnet material into a cylindrical body by the use of an injection metal mold apparatus so that recesses $1a_1$, $1a_2$, ... are coincident with the positions which are the centers of the magnetic poles.

Magnetic poles are magnetized so that the centers of the magnetic poles lie at the centers of said recesses $1a_1$, $1a_2$, ... in the molded cylindrical body.

Figure 1A:
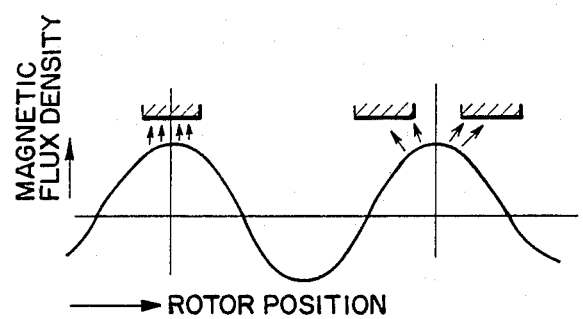
FIG. 1A shows the relation between the magnetizing wave form of a rotor and a stator.
Figure 1B:
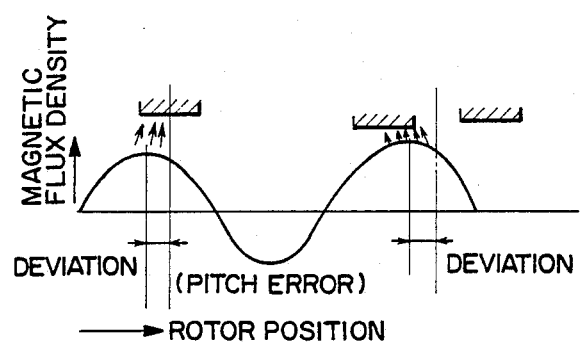
FIG. 1B shows the deviation between the magnetic poles of the rotor and the stator.
Figure 1C:
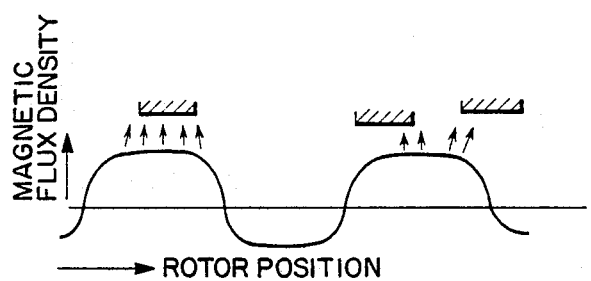
FIG. 1C illustrates the distribution curve of the strength of the magnetic flux of the rotor as it is made into a trapezoidal wave form.
Figure 1D:
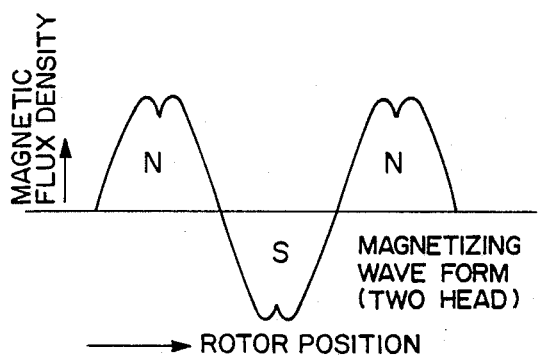
FIG. 1D shows the distribution curve of the strength of the magnetic flux when recesses are formed at the centers of the magnetic poles of the rotor.

A recess is formed at the center of each magnetic pole of the magnet rotor 1 and therefore, the strength of the magnetic flux from the S pole toward the N pole assumes a shape as shown in FIG. 1D wherein the top of the sine curve shown in FIG. 1A is depressed (herein referred to as the two-head wave form). The degree of depression of the top of the curve varies in conformity with the setting of depth and width of the recesses in the surface of the rotor, and assumes a wave form approximate to the trapezoidal wave form shown in FIG. 1C.

If as previously described, recesses are formed at the centers of the magnetic poles of the rotor 1 and the rotor is constructed so that the wave form of the distribution of magnetic flux density is the trapezoidal wave form of FIG. 1C or the two-head wave form of FIG. 1D, the magnetic flux densities from the magnetic poles of the magnet rotor 1 toward the stator side tooth portions (for example, the tooth portions $10a_1$, $10a_2$, ... of the first yoke member) are weakened as shown in FIG. 1C. Therefore, when the power supply is cut off when the rotor is set at a predetermined position between tooth portions $10a_1$ and $10a_2$, the rotor stops and stably remains at said predetermined position without seeking another position of stability.

On the other hand, if sine curve magnetization is effected without recesses being formed in the surface of the magnet rotor 1, when the magnet rotor is stopped by the aforedescribed exposure control device with the centers of the magnetic poles lying at the intermediate positions between the tooth portions $10a_1$, $10a_2$, ... of the yoke member, as shown in FIG. 1B, the rotor 1 rotates to the aforementioned stable position because of the strength of the magnetic flux at the center of the magnetic pole.

As described above, according to the present invention, recesses comprising concave or V-shaped grooves are formed at the centers of the magnetic poles of the rotor which is the rotor of the motor and the motor is provided with an anisotropic resin magnet rotor whose magnetic flux density wave form is a double-headed wave form or a trapezoidal wave form and therefore, the stop position accuracy is improved by increasing the number of stable positions by doubling the frequency of the cogging torque as per theory, i.e., as designed, and there is obtained a stable motor characteristic in which irregularity of torque is small, and there can be provided a compact light-weight stepping motor which can hold an excellent starting property and controlling function and accordingly is efficient. Also, there can be provided a stepping motor which is very easy to form in an elongated configuration with respect to the axial direction and which is compact and moreover has a small in moment of inertia and high torque.

Particularly, the stepping motor of the present invention, when adopted in an electromagnetic diaphragm device for electrically controlling the aforementioned diaphragm blade, can stop the diaphragm blade at a diaphragm aperture calculated by an exposure control device and can therefore obtain accurate exposure.

Figure 6:
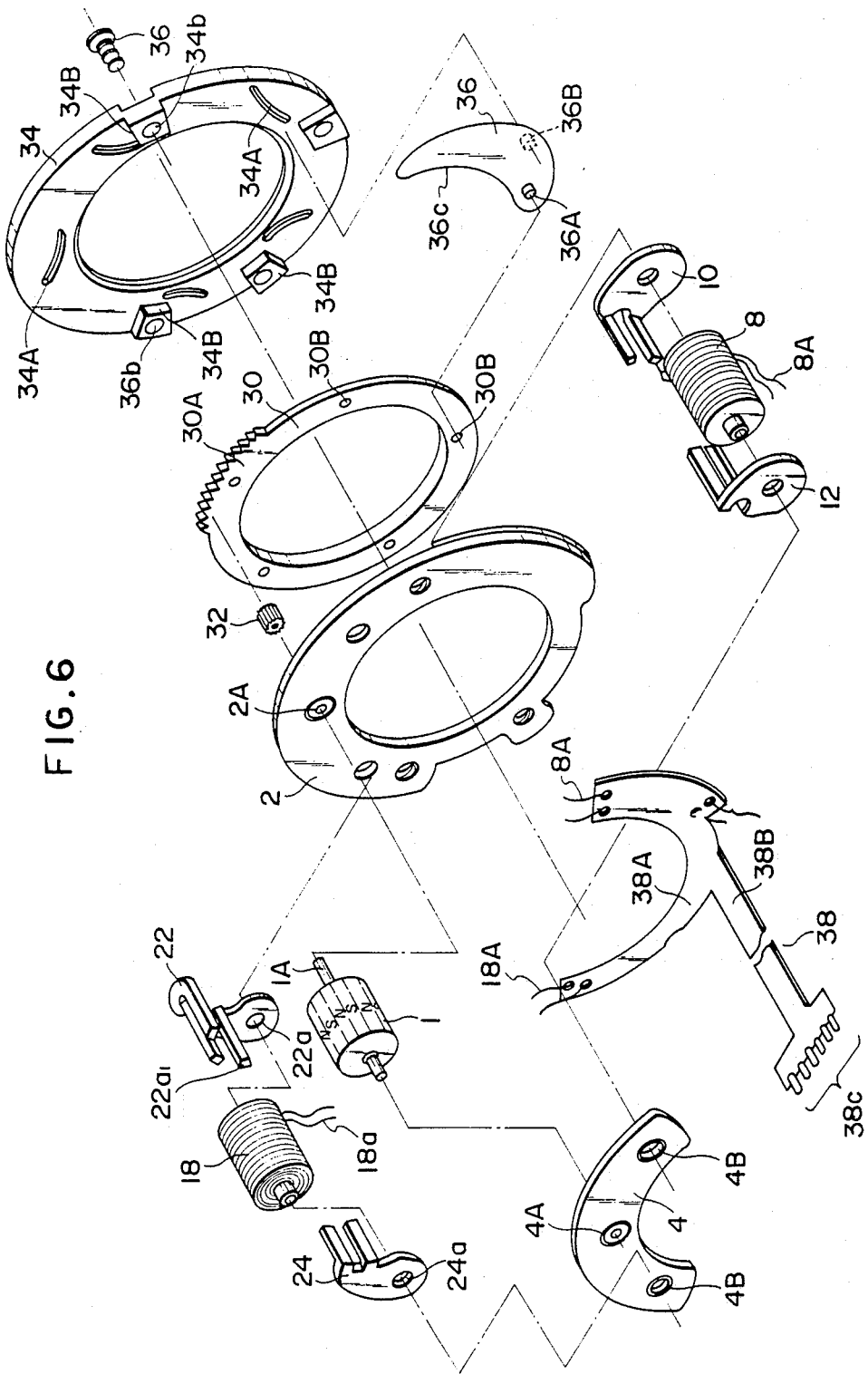
FIG. 6 is an exploded view of a diaphragm unit in which the stepping motor of the present invention is used for diaphragm driving.

FIG. 6 shows an exploded view of a diaphragm device in which the aforedescribed stepping motor is used for the driving of a diaphragm unit.

In FIG. 6, reference characters similar to those in FIG. 2A designate similar parts. The reference numeral 2' denotes a motor supporting plate endowed with the same function as that of the motor supporting plate 2 of FIG. 2A, and in FIG. 6, this motor supporting plate is in the form of a ring.

The reference numeral 30 designates a rotational ring disposed on the back of the motor supporting plate 5' and provided with a rack 30A on the outer peripheral portion thereof. The rack 30A meshes with a pinion gear 32 fixed to the extension of the rotor shaft 1A of the motor which extends through a bearing 2A. The reference numeral 34 denotes a cam plate formed with cam slots 34A, 34A, ... for controlling the aperture of diaphragm blades 36. The cam plate 34 is in the form of a ring. The cam slots 34A in the cam plate 34 are disposed at equal intervals about the optic axis 0.

Five diaphragm blades 36 (only one of which is shown in FIG. 6) are disposed between the rotational ring 30 and the cam plates 34.

Pins 36A and 36B are studded on the front and back surfaces of each diaphragm blade 36, and each pin 36A is engaged with an engagement hole 30B formed in the rotational ring 30, and each pin 36B is engaged with the cam slot 34A in the cam ring 34. Diaphragm blades 36, 36, . . . are placed on the planar portion of the cam ring 34. Projected portions 34B, 34B, . . . are provided on the planar portion of the cam ring, and screws 36 are inserted in holes 34b formed in the projected portions 34B and the screws 36 are fastened in threaded holes, not shown, which are formed in the motor supporting plate 2'.

The remaining four diaphragm blades have their pins 36A and 36B fitted in the holes 30B in the rotational ring and the cam slots 34A in the cam ring 34, respectively.

Each diaphragm blade forms a diaphragm aperture by the diaphragm aperture forming surface 36C thereof.

The reference numeral 38 designates a flexible printed plate comprising an arcuate portion 38A disposed on the surface of the motor supporting plate 2', and an extension 38B, and wiring, not shown, is provided on the printed plate. Power supply terminals 38c are attached to one end of the extension 38B, and some of these terminals are connected to the terminals 18A of the arcuate portion and the others of the terminals 38c are connected to the terminals 8A of the arcuate portion.

The terminals 8A and 18A are connected to the coil terminals 8A and 18A of the first and second coils 8 and 18, respectively, of the aforedescribed motor to supply electric power to each coil.

The condition in which the diaphragm is moved with the stepping motor based on this principle as a drive source will hereinafter be described with reference to FIG. 6. When the rotor 1 rotates, the pinion gear 32 rotates and further, the rotational ring 30 rotates about the optic axis.

The pinion 32 and the rack 30A together constitute a speed reduction mechanism and can rotate the rotational ring 30 sufficiently even if the torque of the rotor 1 is relatively small. The diaphragm blades 36 having their pins 36A fitted in the holes 30B in the rotational ring 30 move relative to the fixed cam plate 34 and therefore, the tip end of each diaphragm blade moves in the diametrical direction. These actions are the same as the operation of the conventional mechanical diaphragm and therefore need not be described in detail. The angle of rotation of the rotational ring is equal because the rotor rotates at equal intervals. Accordingly, by making the shape of the cam slots in the cam plate suitable, the angle of rotation of the rotational ring and the number of steps of the diaphragm can be adjusted to each other. More specifically, setting is made to such a relation that the diaphragm aperture varies by ⅛ step when the rotor advances by one step, that is, the relation is such that the diaphragm varies by one step when the rotor is driven by eight steps.

Figure 7:
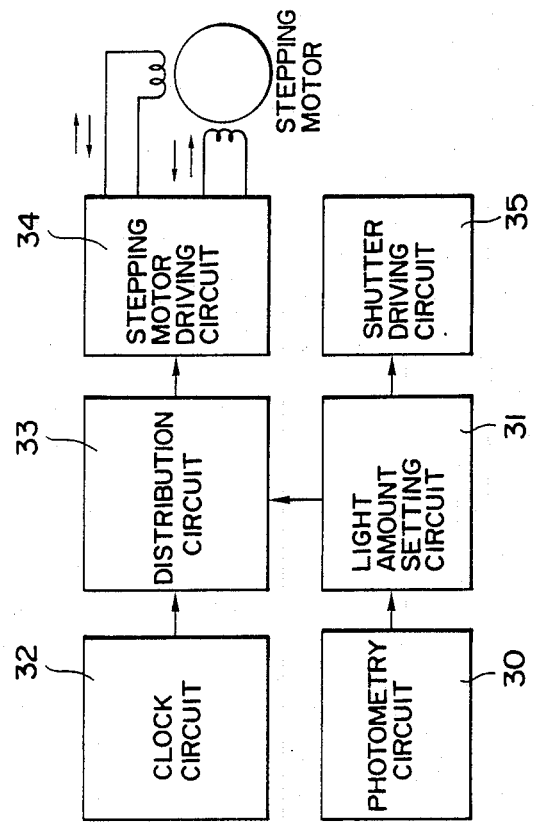
FIG. 7 is a control block diagram of the diaphragm unit.

FIG. 7 shows in block diagram the circuits for carrying out a diaphragm adjusting process from after photometry has been effected by the photometric system of a camera and until the diaphragm is stopped. The amount of light photometered by the photometry circuit 30 of the camera is calculated in a well-known manner with factors such as film speed, shutter speed and aperture value taken into account, whereby the number of aperture steps is determined. This is accomplished by a light amount setting circuit 31. The number of aperture steps is converted into the number of driving steps of the stepping motor by a clock circuit 32 and a distribution circuit 33. To which of the coils 8 and 18 electric power is to be supplied is determined by a stepping motor driving circuit 34 in conformity with said number of steps, whereby the stepping motor can be rotated by any amount. That is, it becomes possible to adjust the amount of rotation of the stepping motor to a designated diaphragm aperture. When the diaphragm blades are to be returned to their initial position, if the operation described in connection with FIG. 3 is performed reversely, the rotor will rotate in the clockwise direction and it will become possible to return the blades to their open position. The reference numeral 35 designates a shutter driving circuit which is controlled on the basis of the output of the light amount setting circuit 31.

I claim:

1. A stepping motor comprising:

a rotor having a cylindrical surface, a shaft and a plurality of N poles and S poles magnetized on the cylindrical surface, said poles each being provided with a recess at the center portion thereof;

a stator unit including a first stator member and a second stator member, said first stator member having a first yoke member provided with a plurality of first teeth arranged arcuately along the outer periphery of said rotor, a second yoke member provided with a plurality of second teeth separated from said first teeth by a predetermined pitch, and a first coil for magnetizing said first and second teeth, said second stator member being disposed at a position opposed to said first stator member with said rotor disposed therebetween, said second stator member having a third yoke member provided with a plurality of arcuately arranged third teeth and a fourth yoke member provided with a plurality of fourth teeth separated from said third teeth by said predetermined pitch, and a second coil for magnetizing said third and fourth teeth.

2. A stepping motor according to claim 1, wherein said recesses are formed so that the distribution curve of strength of magnetic flux from each magnetic pole of said rotor is a double-peaked wave form or a trapezoidal wave form, and the number of the coggings of said rotor is thereby made greater than the number of the magnetized magnetic poles of said rotor.

* * * * *

UNITED STATES PATENT AND TRADEMARK OFFICE
CERTIFICATE OF CORRECTION

PATENT NO. : 4,952,859

DATED : August 28, 1990

INVENTOR(S) : Akira TORISAWA, ET AL.

It is certified that error appears in the above-identified patent and that said Letters Patent is hereby corrected as shown below:

ON COVER PAGE

At [73] Assignees::

"Saitanam," should read --Chichibu,--.

Insert:

--[30] Foreign Application Priority Data:
Dec. 17, 1987 [JP] Japan  62-319929
Jan. 12, 1988 [JP] Japan  63-004526--.

At [56] References Cited:

Under "U.S. Patent Documents", "Semonen et al." should read --Semones et al.--.
Under "U.S. Patent Documents" "4,704,292  12/88  Torisawa et al." should read --4,794,292  12/88  Torisawa--.

COLUMN 1:

Line 47, "N (North) poles and S poles" should read --N (north) poles and S (south) poles--.
Line 49, "stopped," should read --stops,--.
Line 59, "moved" should read --move--.
Line 67, "provided" should read --provide--.

COLUMN 2:

Line 48, before "cogging" insert --the--.
Line 50, "the double of" should read --twice--.
Line 50, delete "the" (third occurrence).

UNITED STATES PATENT AND TRADEMARK OFFICE
CERTIFICATE OF CORRECTION

PATENT NO. : 4,952,859
DATED : August 28, 1990
INVENTOR(S) : Akira Torisawa, et al It is certified that error appears in the above-identified patent and that said Letters Patent is hereby corrected as shown below:

Column 2, line 56, "propose" should read --provide--.
Column 2, line 58, "sine", should read --sine--.

COLUMN 3:

Line 46, "by" should be deleted.

COLUMN 6:

Line 34, "in" should be deleted.

COLUMN 7:

Line 55, "from after" should read --from the time after--.

COLUMN 8:

Line 25, "I claim:" should read --We claim:--.

Signed and Sealed this

Eleventh Day of May, 1993

Attest:

MICHAEL K. KIRK

Attesting Officer   Acting Commissioner of Patents and Trademarks